United States Patent
Wei et al.

(10) Patent No.: US 9,761,380 B2
(45) Date of Patent: Sep. 12, 2017

(54) APPARATUS AND ASSOCIATED METHODS

(75) Inventors: Di Wei, Cambridge (GB); Chris Bower, Ely (GB); Teuvo Tapani Ryhanen, Cambridge (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 744 days.

(21) Appl. No.: 12/846,569

(22) Filed: Jul. 29, 2010

(65) Prior Publication Data

US 2012/0028127 A1 Feb. 2, 2012

(51) Int. Cl.

| | | |
|---|---|---|
| *H01M 4/02* | (2006.01) | |
| *B82Y 30/00* | (2011.01) | |
| *H01B 1/24* | (2006.01) | |
| *H01G 11/30* | (2013.01) | |
| *H01G 11/32* | (2013.01) | |
| *H01M 4/133* | (2010.01) | |
| *H01M 4/1393* | (2010.01) | |
| *H01M 4/36* | (2006.01) | |
| *H01M 4/587* | (2010.01) | |
| *H01M 4/62* | (2006.01) | |
| *H01M 10/052* | (2010.01) | |
| *H01M 10/0562* | (2010.01) | |
| *H01M 10/0565* | (2010.01) | |

(Continued)

(52) U.S. Cl.
CPC ............... *H01G 11/30* (2013.01); *B82Y 30/00* (2013.01); *H01B 1/24* (2013.01); *H01G 11/32* (2013.01); *H01G 11/36* (2013.01); *H01G 11/46* (2013.01); *H01M 4/133* (2013.01); *H01M 4/1393* (2013.01); *H01M 4/364* (2013.01); *H01M 4/587* (2013.01); *H01M 4/62* (2013.01); *H01M 4/622* (2013.01); *H01M 4/625* (2013.01); *H01M 10/052* (2013.01); *H01M 10/0562* (2013.01); *H01M 10/0565* (2013.01); *Y02E 60/13* (2013.01)

(58) Field of Classification Search
CPC ......... H01B 1/07; H01B 1/24; H01L 2924/00; H01L 2924/02; H01M 4/133; H01M 4/622; H01M 4/625
USPC .............. 252/500–511; 429/126–304, 218.1, 429/231.8; 977/734
See application file for complete search history.

(56) References Cited

U.S. PATENT DOCUMENTS 6,007,945 A * 12/1999 Jacobs et al. .............. 429/218.1
2001/0049060 A1* 12/2001 Aurbach .............. C01G 28/007
429/303

(Continued)

FOREIGN PATENT DOCUMENTS

CN 101179139 A 5/2008
CN 101593827 A 12/2009

(Continued)

OTHER PUBLICATIONS

Stankovich ("Stable aqueous dispersions of graphitic nanoplatelets via the reductionof exfoliated graphite oxide in the presence of poly(sodium 4-styrenesulfonate)." JMC, 16, pp. 155-158, pub Nov. 21, 2005).*

(Continued)

*Primary Examiner* — Tri V Nguyen
(74) *Attorney, Agent, or Firm* — Harrington & Smith

(57) ABSTRACT

An electrode comprises graphene, titanium dioxide and a binder, the binder configured to facilitate the binding together of the graphene and titanium dioxide to form the electrode.

7 Claims, 7 Drawing Sheets

(51) Int. Cl.
    H01G 11/36    (2013.01)
    H01G 11/46    (2013.01)

(56) References Cited

U.S. PATENT DOCUMENTS

| | | | |
|---|---|---|---|
| 2007/0231696 A1* | 10/2007 | Yazami et al. | 429/231.7 |
| 2009/0176162 A1* | 7/2009 | Exnar et al. | 429/336 |
| 2010/0021819 A1* | 1/2010 | Zhamu et al. | 429/231.8 |
| 2010/0081057 A1* | 4/2010 | Liu et al. | 429/231.5 |
| 2010/0294350 A1* | 11/2010 | Ko et al. | 136/255 |
| 2011/0129732 A1* | 6/2011 | Bachrach et al. | 429/220 |
| 2011/0151321 A1* | 6/2011 | Bosnyak | H01M 4/04 429/207 |
| 2011/0157772 A1* | 6/2011 | Zhamu et al. | 361/502 |
| 2011/0165462 A1* | 7/2011 | Zhamu et al. | 429/223 |
| 2011/0165466 A1* | 7/2011 | Zhamu et al. | 429/231.8 |
| 2011/0183180 A1* | 7/2011 | Yu et al. | 429/128 |
| 2011/0275005 A1* | 11/2011 | Zhu et al. | 429/482 |

FOREIGN PATENT DOCUMENTS

| | | |
|---|---|---|
| CN | 101651233 A | 2/2010 |
| CN | 101710619 A | 5/2010 |
| WO | WO 2009099707 A1 | 8/2009 |
| WO | WO-2010/014215 A2 | 2/2010 |
| WO | WO2010115904 A1 | 10/2010 |

OTHER PUBLICATIONS

Wang ("Highly efficient and large-scale synthesis of graphene by electrolytic exfoliation." Carbon, 47, pp. 3242-3246, pub Jul. 19, 2009).*

International Search Report for PCT Application No. PCT/FI2011/050356, dated Aug. 18, 2011.

Written Opinion for PCT Application No. PCT/FI2011/050356, dated Aug. 18, 2011.

Gratzel, M., "Dye-sensitized solar cells", J. Photochem, Photobiol. C., vol. 4, No. 2, pp. 145-153, Oct. 31, 2003.

Sun, S., "Enhanced dye-sensitized solar cell using graphene-TiO2 photoanode prepared by heterogeneous coagulation", Appl.Phys. Letters, 96, Feb. 26, 2010.

Eizenberg, M. et al., "Carbon Monolayer Phase Condensation on Ni(111)", Surface Science, vol. 82, pp. 228-236, North-Holland Publishing Company, 1979.

Saibaba, G. et al., "Preparation and study of conductivity in lithium salt complexes of mixed MEEP : PEO polymer electrolytes", Bull. Mater. Sci., vol. 27, No. 1, pp. 51-55, Indian Academy of Sciences, Feb. 2004.

Berger, Claire et al., "Electronic Confinement and Coherence in Patterned Epitaxial Graphene", Science, vol. 312, 1191-1196, May 26, 2006.

Paek, Seung-Min et al., "Enhanced Cyclic Performance and Lithium Storage Capacity of SnO2/ Graphene Nanoporous Electrodes with Three-Dimensionally Delaminated Flexible Structure", Nano Letters, vol. 9, No. 1, pp. 72-75, 2008.

Poland, Craig A. et al., "Carbon nanotubes introduced into the abdominal cavity of mice show asbestos-like pathogenicity in a pilot study", Nature, Advanced Online Publication, Nature Publishing Group, May 20, 2008.

Yoo, EunJoo et al., "Large Reversible Li Storage of Graphene Nanosheet Families for Use in Rechargeable Lithium Ion Batteries", Nano Letters,vol. 8, No. 8, pp. 2277-2282, American Chemical Society, 2008.

Park, Sungjin et al., "Chemical methods for the production of graphenes", Nature Nanotechnology, vol. 4, pp. 217-224, Macmillan Publishers Limited, Apr. 2009.

* cited by examiner

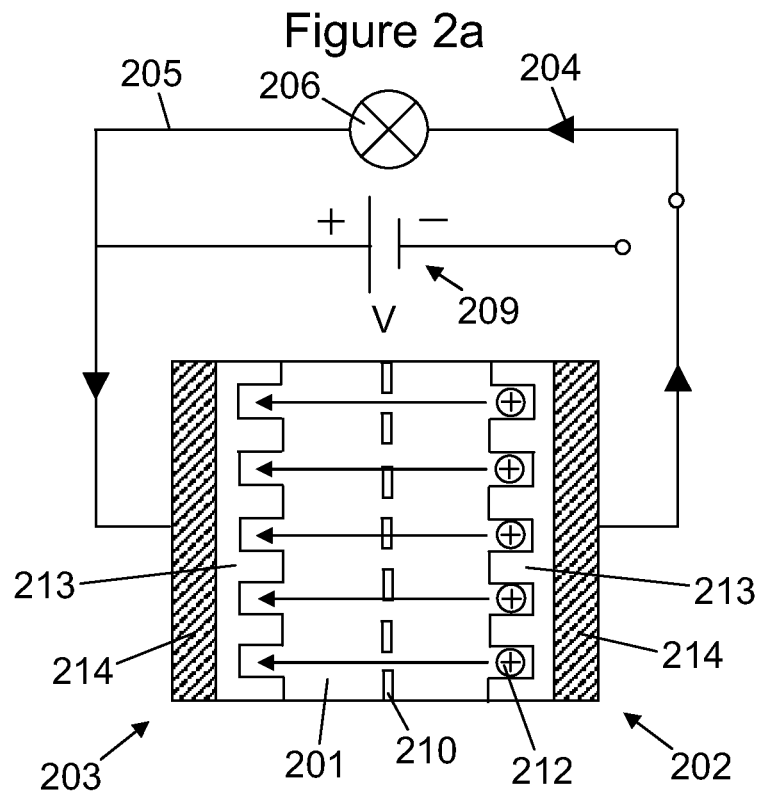
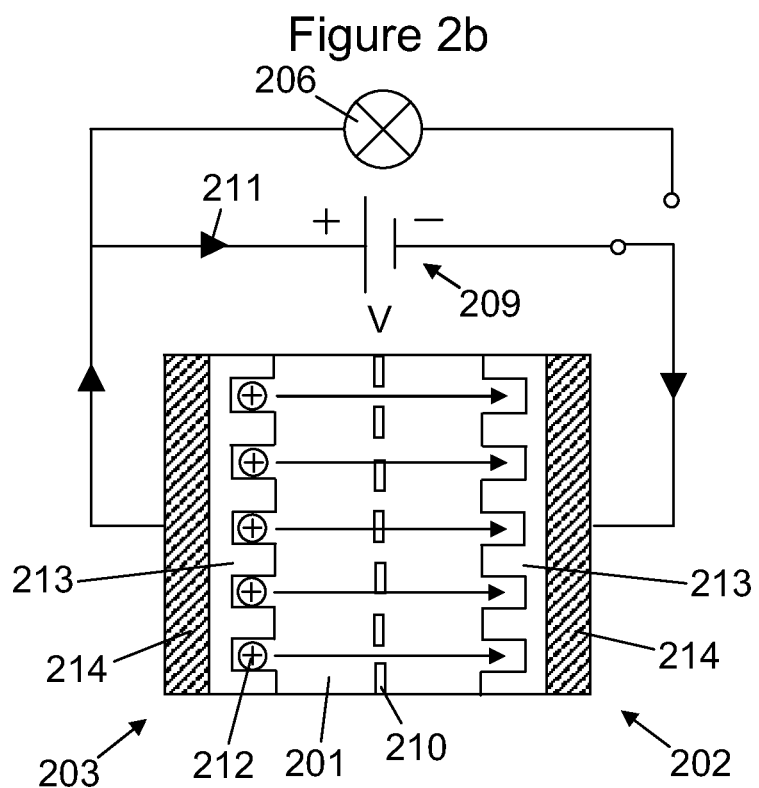

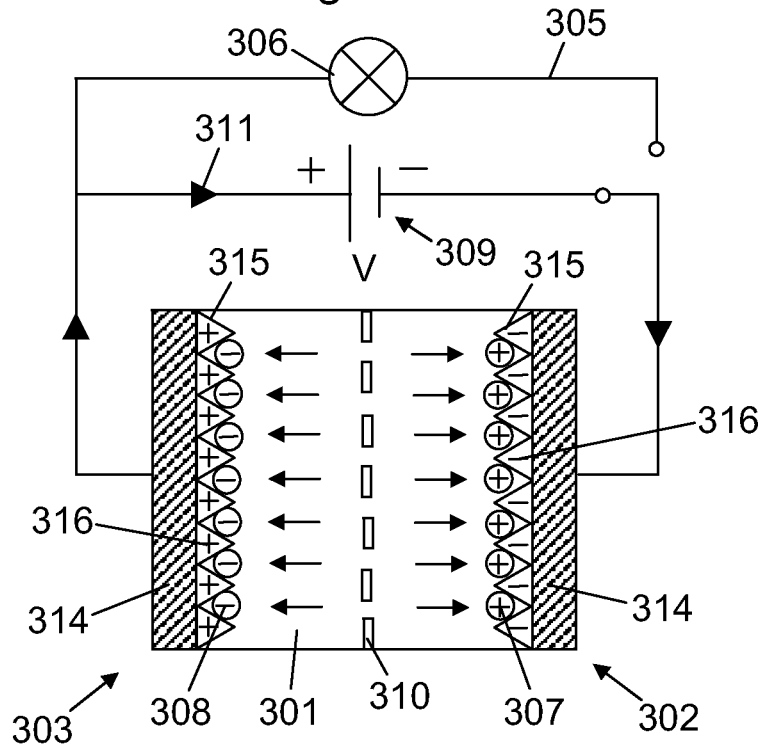
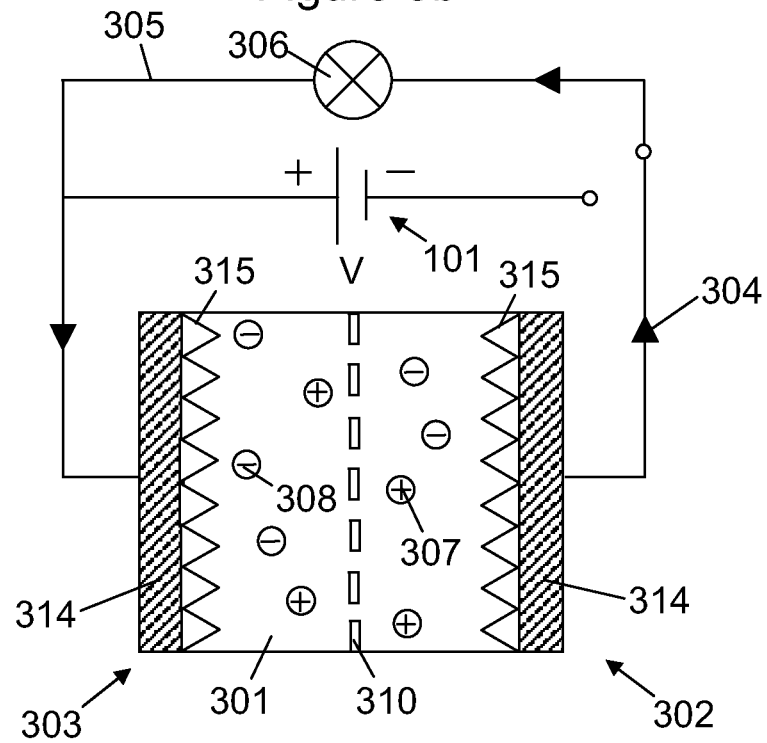

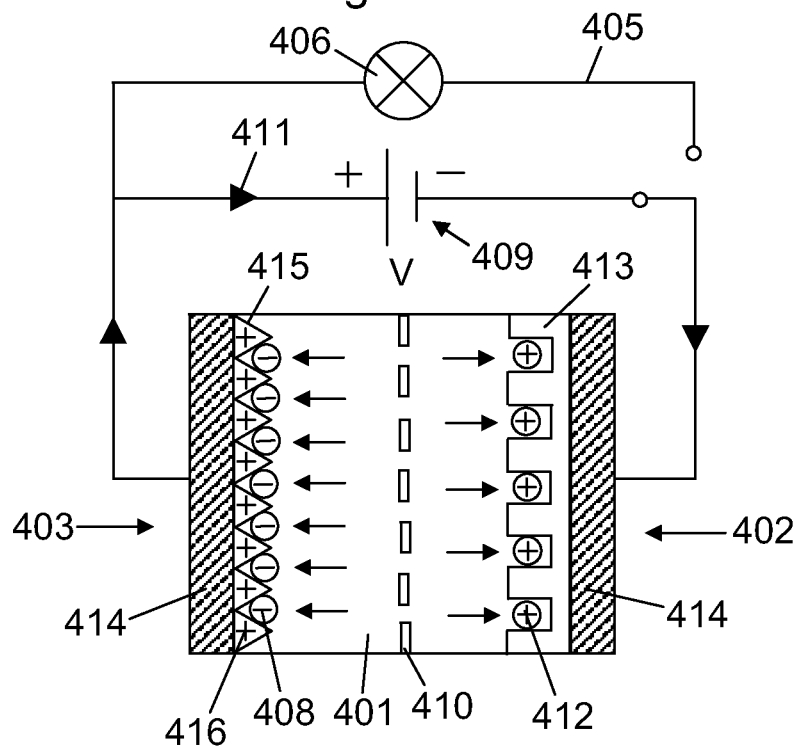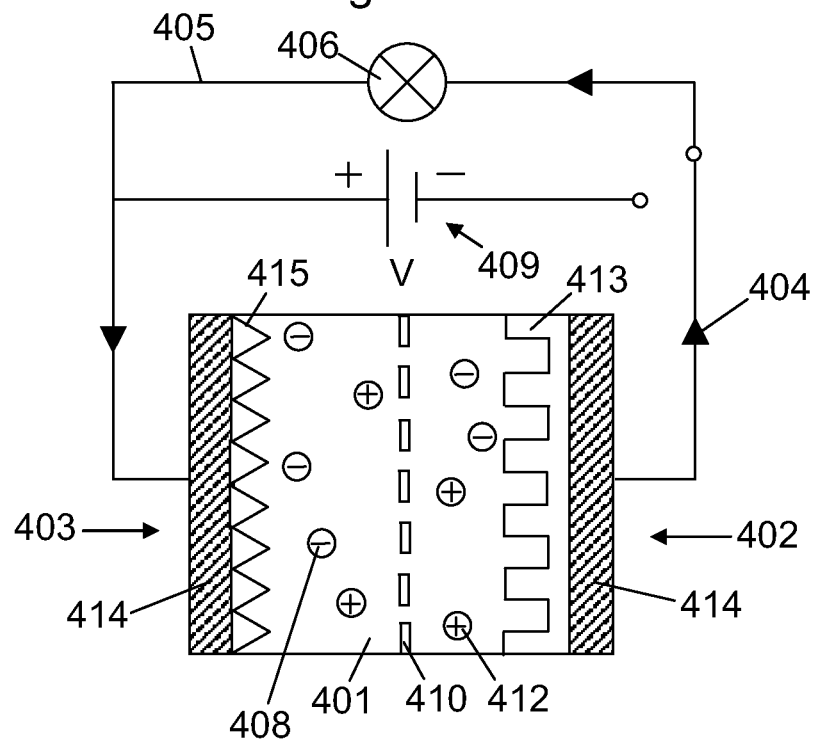

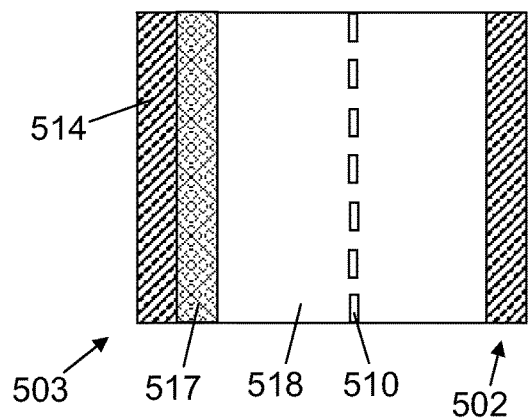
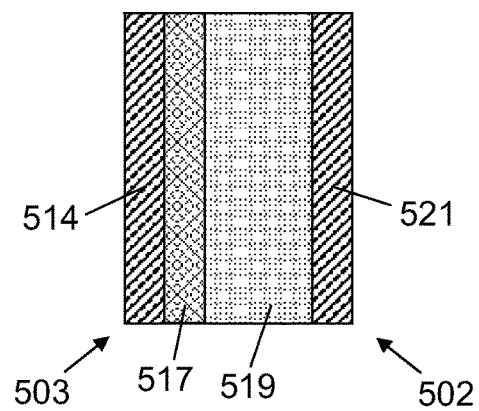
Figure 5a
Figure 5b
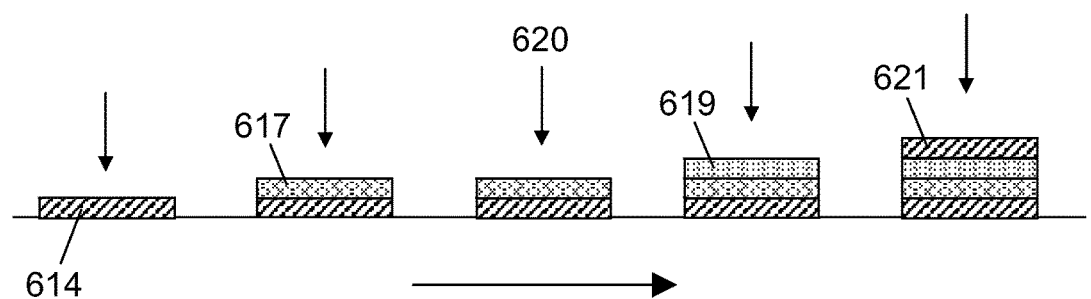
Figure 6
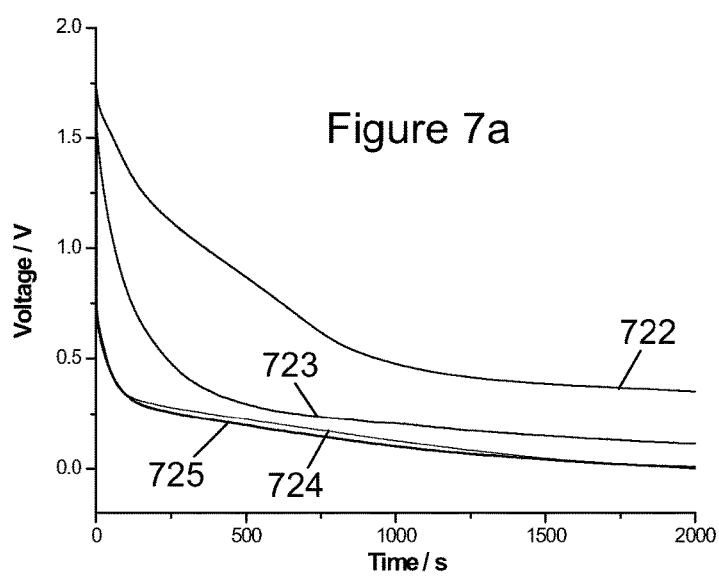
Figure 7a

APPARATUS AND ASSOCIATED METHODS

TECHNICAL FIELD

The present disclosure relates to the field of printable electronics, associated apparatus and methods, and in particular concerns a graphene-based ink formulation for forming the electrodes of printable batteries and supercapacitors. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. tele-communication, video-communication, and/or text transmission, Short Message Service (SMS)/Multimedia Message Service (MMS)/emailing functions, interactive/ non-interactive viewing functions (e.g. web-browsing, navigation, TV/program viewing functions), music recording/ playing functions (e.g. MP3 or other format and/or (FM/ AM) radio broadcast recording/playing), downloading/ sending of data functions, image capture function (e.g. using a (e.g. in-built) digital camera), and gaming functions.

BACKGROUND

The increasing capability and functionality of portable electronic devices places increasing demands on energy storage media and drives technological advancement in battery and capacitor technology. Next generation portable devices require solid-state batteries and capacitors with high power density and flexibility to meet the various power and design needs. Furthermore, in order to satisfy industry volume demands, the energy storage media must be capable of mass production at a reasonable cost.

Printable electronics is a relatively new field of device fabrication in which common printing techniques are used in conjunction with conductive electronic inks to mass-produce extremely thin, flexible and cheap electronic circuits. Despite its many benefits, however, the performance of printable electronics in terms of function and reliability is currently less than that of conventional electronics. One of the biggest challenges facing printable electronics lies in the materials used for printing. There are many nanomaterials and nanoparticles available, but very few of these have been developed into printable inks. Another challenge lies in the fabrication process. Most of the current processes are in the prototype stage and involve many parameters that need to be optimised before they can be used for mass-production. Cost and yield must also be improved if printing is to become a standard process for fabricating electronics.

With respect to batteries and capacitors, graphite is a popular material for fabricating lithium battery electrodes due to its high reactivity and ion adsorption properties. Recently, however, carbon nanotubes (CTNs) and other carbon nanomaterials have been used to form novel electrodes in order to enhance the storage capacity, but the poor solubility of CNTs renders them unsuitable for printable electronics. CNTs can be modified with functional groups to improve their solubility, but this sacrifices their intrinsic conductivity. Furthermore, the potential toxicity of CNTs (human inhalation of fine particles similar to asbestos fibres can cause lung cancer, asbestosis and malignant mesothelioma) may limit their application in consumer products.

The apparatus and associated methods disclosed herein may or may not address one or more of these issues.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an electrode comprising graphene, titanium dioxide and a binder, the binder configured to facilitate the binding together of the graphene and titanium dioxide to form the electrode.

The binder may be a polymer. The binder may comprise one or more ionic species. The binder may comprise one or more of the following: poly(sodium 4-styrenesulfonate), polyaniline, and poly[2,5-bis(3-sulfonatopropoxy)-1,4-ethynylphenylene-alt-1,4-ethynylphenylene]sodium salt. The graphene may be in the form of graphene platelets. The titanium dioxide may be in the form of rutile or anatase particles. The electrode may comprise a lithium salt. The lithium salt may comprise one or more of the following: $LiPF_6$, $LiBF_4$ and $LiClO_4$.

According to a further aspect, there is provided an apparatus comprising any electrode described herein. The apparatus may be one or more of an electrical storage apparatus, circuitry for an electrical storage apparatus, and a module for an electrical storage apparatus. The apparatus may form part of portable electronic device or part of a module for a portable electronic device. The portable electronic device may be a portable telecommunications device.

The electrical storage apparatus may comprise first and second electrodes and an electrolyte. At least the first electrode may be any electrode described herein. The electrolyte may be configured to allow the transfer of mobile ions to and/or from the first and/or second electrodes to enable the generation and/or storage of electrical energy.

The electrolyte may be a solid or gel electrolyte. The solid or gel electrolyte may comprise lithium phosphorous oxynitride. The electrolyte may be a polymer electrolyte. The polymer may comprise one or more of the following: derivates of poly(ethylene oxide), and borate ester groups.

The electrical storage apparatus may be a battery or a capacitor. The electrical storage apparatus may be a lithium-metal battery, a lithium-ion battery, or a lithium-ion capacitor. The electrical storage apparatus may form part of a portable electronic device or part of a module for an electronic device. The portable electronic device may be a portable telecommunications device.

According to a further aspect, there is provided a method of making an electrode, the method comprising:
  forming an electrode formulation, the electrode formulation comprising graphene, titanium dioxide and a binder; and
  depositing the electrode formulation using a printing or coating process to form an electrode, the electrode comprising graphene, titanium dioxide and a binder, the binder configured to facilitate the binding together of the graphene and titanium dioxide in the formed electrode.

The steps of any method disclosed herein do not have to be performed in the exact order disclosed, unless explicitly stated.

The term "electrode formulation" may be used interchangeably with the term "ink" throughout the specification. These terms relate to the fluid (possibly liquid or gel) composition used to form the electrode. On the other hand, the resulting material after the composition has been deposited and heated (to evaporate the solvent, facilitate binding of the graphene and titanium dioxide, and encourage the electrode formulation to bond to the charge collection material) may be termed the "electrode". The combination of charge-collection material and deposited/heated composition may also be termed the "electrode".

The stage of forming the electrode formulation may comprise mixing graphene oxide and the binder together in a solvent; adding a reducing agent to reduce the graphene oxide to form a colloidal suspension of graphene platelets; adding titanium dioxide particles to the colloidal suspension of graphene platelets; and mixing the titanium dioxide and colloidal suspension together to form a homogeneous colloidal suspension.

The method of making the electrode may comprise adding a lithium salt to the electrode formulation before deposition. The method of making the electrode may comprise heating the electrode formulation after deposition to evaporate the solvent and facilitate the binding together of the graphene and titanium dioxide. The electrode may be deposited onto a charge-collection material (substrate).

According to a further aspect, there is provided an electrode formulation comprising graphene, titanium dioxide and a binder, the binder configured to facilitate the binding together of the graphene and titanium dioxide in a formed electrode.

The graphene and titanium dioxide may be in the form of graphene platelets and titanium dioxide particles, respectively. The graphene platelets and titanium dioxide particles may be dispersed within the binder in the form of a colloidal suspension. The electrode formulation may comprise a lithium salt.

According to a further aspect, there is provided a graphene-based ink formulation, the graphene-based ink formulation comprising a suspension of graphene platelets modified by counter anions together with titanium dioxide nanoparticles and a lithium salt, the graphene-based ink formulation configured for deposition using a printing or coating process to form a first electrode of an electrical storage apparatus, the electrical storage apparatus comprising first and second electrodes and an electrolyte, the electrolyte configured to allow the transfer of mobile ions to and/or from the first and/or second electrodes to enable the generation and/or storage of electrical energy.

The term "counter anions" may be equivalent to the term "binder" as used throughout the specification.

According to a further aspect, there is provided a method of making an electrical storage apparatus, the method comprising:
forming an electrode formulation, the electrode formulation comprising graphene, titanium dioxide and a binder, the binder configured to facilitate the binding together of the graphene and titanium dioxide in a formed electrode;
depositing the electrode formulation using a printing or coating process to form a first electrode of the electrical storage apparatus;
depositing an electrolyte on top of the first electrode; and
depositing an electrode material on top of the electrolyte to form a second electrode of the electrical storage apparatus, the electrical storage apparatus comprising first and second electrodes and an electrolyte, the electrolyte configured to allow the transfer of mobile ions to and/or from the first and/or second electrodes to enable the generation and/or storage of electrical energy.

According to a further aspect, there is provided a computer program for controlling the making of an electrode, the computer program comprising computer code configured to control one or both of:
formation of an electrode formulation, the electrode formulation comprising graphene, titanium dioxide and a binder; and
deposition of the electrode formulation using a printing or coating process to form the electrode, the electrode comprising graphene, titanium dioxide and a binder, the binder configured to facilitate the binding together of the graphene and titanium dioxide in the formed electrode.

According to a further aspect, there is provided a computer program for controlling the making of an electrical storage apparatus, the computer program comprising computer code configured to control one or more of:
formation of an electrode formulation, the electrode formulation comprising graphene, titanium dioxide and a binder, the binder configured to facilitate the binding together of the graphene and titanium dioxide in a formed electrode;
deposition of the electrode formulation using a printing or coating process to form a first electrode of the electrical storage apparatus;
deposition of an electrolyte on top of the first electrode; and
deposition of an electrode material on top of the electrolyte to form a second electrode of the electrical storage apparatus, the electrical storage apparatus comprising first and second electrodes and an electrolyte, the electrolyte configured to allow the transfer of mobile ions to and/or from the first and/or second electrodes to enable the generation and/or storage of electrical energy.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 2a illustrates schematically the discharge process of a lithium-ion battery;

FIG. 2b illustrates schematically the charging process of a lithium-ion battery;

FIG. 3a illustrates schematically the charging process of a supercapacitor;

FIG. 3b illustrates schematically the discharge process of a supercapacitor;

FIG. 4a illustrates schematically the charging process of a lithium-ion capacitor;

FIG. 4b illustrates schematically the discharge process of a lithium-ion capacitor;

FIG. 5a illustrates schematically an electrical storage apparatus comprising a liquid electrolyte and an electrode formulation described herein;

FIG. 5b illustrates schematically an electrical storage apparatus comprising a solid or gel electrolyte and an electrode formulation described herein;

FIG. 6 illustrates schematically a method of producing the electrical storage apparatus of FIG. 5b;

FIG. 7a compares the discharge performance of lithium-ion batteries comprising different electrode formulations;

DESCRIPTION OF SPECIFIC ASPECTS/EMBODIMENTS

In electrical circuits, batteries and capacitors are used to provide other components with electrical power. These power supplies operate in completely different ways, however.

Figure 1A:
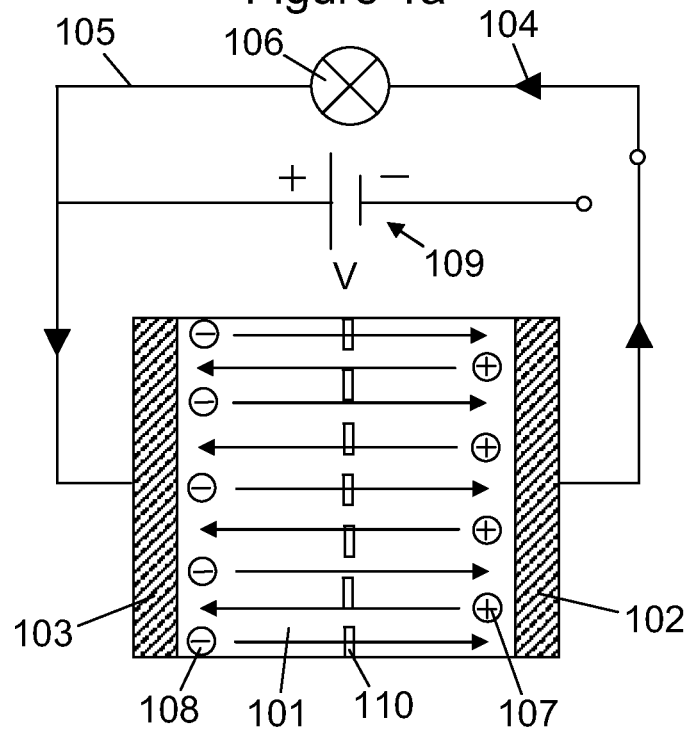
FIG. 1a illustrates schematically the discharge process of a conventional battery.

Batteries use electrochemical reactions to generate electricity. The discharge process of a conventional battery is shown in FIG. 1a. Batteries comprise two electrical terminals (electrodes 102, 103) separated by an electrolyte 101. A battery may also contain a separator 110 to prevent direct physical contact between the electrodes, which is particularly important when liquid electrolytes are used. At the negative electrode (the anode 102), an oxidation reaction takes place which produces electrons. These electrons flow round an external circuit 105 (indicated by the arrows 104) from the anode 102 to the positive electrode (the cathode 103) causing a reduction reaction to take place at the cathode 103. The flow of electrons can be used to power one or more electrical components 106 in the external circuit 105. The oxidation and reduction reactions may continue until the reactants are completely converted. Importantly though, unless electrons are able to flow from the anode 102 to the cathode 103 via the external circuit 105, the electrochemical reactions cannot take place. This allows batteries to store electricity for long periods of time. As the electrons flow round the external circuit from the anode 102 to the cathode 103, a negative charge cloud develops in the electrolyte 101 around the cathode 103, and a positive charge cloud develops in the electrolyte 101 around the anode 102. Positive 107 and negative 108 ions in the electrolyte 101 move to neutralise these charge clouds, allowing the reactions, and the flow of electrons, to continue. Without the ions 107, 108 from the electrolyte 101, the charge clouds around each electrode 102, 103 would inhibit the generation of electricity.

Figure 1B:
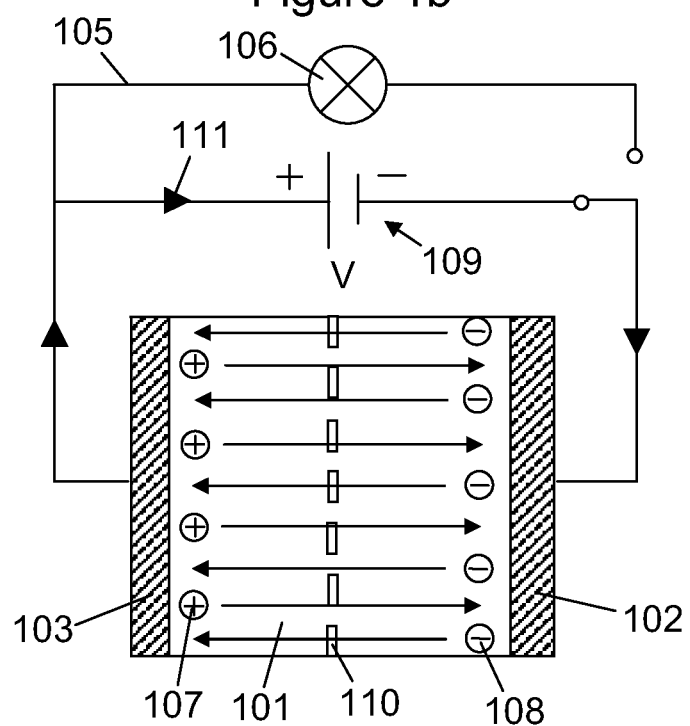
FIG. 1b illustrates schematically the charging process of a conventional battery.

A primary cell is any kind of battery in which the electrochemical reaction is not reversible. These are used as disposable batteries. With secondary batteries, on the other hand, the electrochemical reaction is reversible, meaning that the chemical reactants can be restored to their original state. These are used as rechargeable batteries. The charging process of a conventional rechargeable battery is shown in FIG. 1b. To charge the battery, a potential difference is applied between the anode 102 and cathode 103. The positive terminal of the charger 109 strips electrons from the cathode 103 and returns them to the anode 102 (indicated by the arrows 111), inducing chemical reactions at the electrode-electrolyte interface. Again, to compensate for the transfer of charge, positive 107 and negative 108 ions in the electrolyte 101 move between the electrodes 102, 103 in opposite directions to before.

The current and voltage generated by a battery is directly related to the materials used for the electrodes and electrolyte. The ability of a material to lose or gain electrons with respect to another material is known as its electrode potential. The strengths of oxidising and reducing agents are indicated by their standard electrode potentials. Materials with a positive electrode potential are used to form the anode, whilst those with a negative electrode potential are used to form the cathode. The greater the difference between the anode and cathode potentials, the greater the amount of electrical energy that can be produced by the cell.

Lithium appears at the top of the electrochemical series (large negative electrode potential), indicating that it is the strongest reducing agent. Likewise, fluorine appears at the bottom of the electrochemical series (large positive electrode potential), indicating that it is the strongest oxidising agent. As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically. Recently, novel architectures have been employed to improve the performance of these batteries. Pure lithium is very reactive and will rigorously react with water to form lithium hydroxide and hydrogen gas. For this reason, non-aqueous electrolytes are used, and water is rigidly excluded from the battery pack using a sealed container.

That said, many different lithium batteries exist because of lithium's low reactivity with a number of cathodes and non-aqueous electrolytes. The term "lithium battery" refers to a family of different chemistries comprising lithium metal or lithium compounds as the anode with a host of different materials for the cathodes and electrolytes. A porous carbon material often serves as a cathode charge collector to receive electrons from the external circuit.

A lithium-ion battery is a different type of rechargeable battery which uses a lithium ion "intercalation" mechanism rather than traditional redox reactions. This involves the insertion of lithium ions into and out of the crystal structure of the electrodes as the ions pass back and forth between the electrodes during charging and discharging. To achieve this, the electrodes require open crystal structures which allow the insertion and extraction of lithium ions, and the ability to accept compensating electrons at the same time. Such electrodes are called "intercalation hosts". Lithium-ion batteries are currently one of the most popular types of battery for portable electronics because they exhibit one of the best energy-to-weight ratios, no memory effect, and a slow loss of charge when not in use.

In a typical lithium-ion battery, the anode is made from carbon, the cathode is a metal oxide, and the electrolyte is a lithium salt in an organic solvent. Commercially, the most popular anode material is graphite, and the cathode is generally one of three materials: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate (LiPF$_6$), lithium hexafluoroarsenate monohydrate (LiAsF$_6$), lithium perchlorate (LiClO$_4$), lithium tetrafluoroborate (LiBF$_4$), and lithium triflate (LiCF$_3$SO$_3$).

FIGS. 2a and 2b illustrate schematically the discharge and charging processes of a lithium-ion battery, respectively. As shown in the figures, the anode 202 and cathode 203 each comprise an open-crystal intercalation material 213 deposited on top of a charge-collecting substrate 214. During discharge, lithium ions 212 are extracted from the anode 202, migrate across the electrolyte 201, and are inserted into the crystal structure of the cathode 203. At the same time, compensating electrons travel in the external circuit (in a direction indicated by the arrows 204) and are accepted by the cathode 203 to balance the reaction. This process is completely reversible. During charging, an external electrical power source (the charger 209) applies a potential difference between the electrodes 202, 203 forcing the electrons to travel in the opposite direction (indicated by the arrows 211). The lithium ions 212 are then extracted from the cathode 203, migrate across the electrolyte 201, and are inserted back into the crystal structure of the anode 202.

In a lithium-ion battery, the lithium ions are transported to and from the cathode and anode, with the transition metal, cobalt (Co), in Li$_x$CoO$_2$ being oxidised from Co$^{3+}$ to Co$^{4+}$ during charging, and reduced from Co$^{4+}$ to Co$^{3+}$ during discharge. The anode and cathode half-reactions for a lithium-ion battery comprising a graphite anode and a lithium cobalt oxide cathode are as follows:

$$\text{Anode } x\text{Li}^+ + xe^- + 6\text{C} \leftrightharpoons \text{Li}_x\text{C}_6$$

$$\text{Cathode } \text{LiCoO}_2 \leftrightharpoons \text{Li}_{1-x}\text{CoO}_2 + x\text{Li}^+ + xe^-$$

The overall reaction has its limits, however. Overdischarging the lithium-ion battery can supersaturate the lithium cobalt oxide, leading to the production of lithium oxide, by the following irreversible reaction:

$$\text{Li}^+ + \text{LiCoO}_2 \rightarrow \text{Li}_2\text{O} + \text{CoO}$$

whilst overcharging the lithium-ion battery can lead to the synthesis of Co$^{4+}$ by the following irreversible reaction $$\text{LiCoO}_2 \rightarrow \text{Li}^+ + \text{CoO}_2$$

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

FIGS. 3a and 3b illustrate schematically the charging and discharge processes of a supercapacitor, respectively. Supercapacitors have a cathode 303 and an anode 302, each comprising an electrically conducting plate 314 (charge collector), which are separated by an electrolyte 301. When a liquid electrolyte is used, the supercapacitor may also comprise a separator 310 to prevent direct physical contact between the cathode and anode. The plates 314 are coated in a porous material 315 (such as powdered carbon) to increase their surface area for greater charge storage. When a power supply (charger) applies a potential difference between the electrodes 302, 303, the electrolyte 301 becomes polarised. The potential on the cathode 303 attracts negative ions 308 in the electrolye 301, and the potential on the anode 302 attracts positive ions 307.

Unlike batteries, the applied potential is kept below the breakdown voltage of the electrolyte 301 to prevent electrochemical reactions from taking place at the surface of the electrodes 302, 303. For this reason, supercapacitors cannot generate electricity like electrochemical cells. Also, without electrochemical reactions taking place, no electrons are generated. As a result, no significant current can flow between the electrolyte 301 and the electrodes 302, 303. Instead, the ions 307, 308 in solution arrange themselves at the surfaces of the electrodes 302, 303 to mirror the surface charge 316 and form an insulating "electric double layer". In an electric double layer (i.e. a layer of surface charge 316 and a layer of ions 307, 308), the separation of the surface charge 316 and ions 307, 308 is on the order of nanometers. The combination of the electric double layer and the use of a high surface area material 315 on the surface of the plates 314 allow a huge number of charge carriers to be stored at the electrode-electrolyte interface.

To discharge the supercapacitor, an electrical connection 305 is made between the charged electrodes 302, 303, causing electrons to flow from the anode to the cathode via the external circuit (as indicated by the arrows 304). This flow of charge can be used to power one or more electrical components 306 in the external circuit 305.

Activated carbon is not the most suitable material 315 for coating the plates 314 of the capacitor, however. The ions 307, 308 in solution are relatively large in comparison to the pores in the carbon, and this limits the energy storage considerably. Recent research in this area has focused on the use of carbon nanotubes and carbon nanohorns instead, both of which offer higher useable surface areas than activated carbon.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Lithium-ion batteries have the highest energy density of all systems, whilst supercapacitors have the highest power density and lifetime. Recently, a new hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density. Furthermore, the capacity of the anode is several orders of magnitude greater than the capacity of the cathode. As a result, the change in anode potential during charging and discharging is far smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

FIGS. 4a and 4b illustrate schematically the charging and discharge processes of a lithium-ion capacitor, respectively. The behaviour of a lithium-ion capacitor is much the same as that of a supercapacitor, and therefore the reference numerals of FIGS. 4a and 4b correspond to similar features in FIGS. 3a and 3b. The main difference between the two systems, however, is that instead of positive ions in the electrolyte 401 arranging themselves at the electrode-electrolyte interface to form an electric double layer when the device charges, lithium ions 412 insert themselves (intercalation) into the crystal structure 413 of the anode 402. Like a lithium-ion battery, therefore, lithium-ion capacitors undergo fast electrochemical reactions and do not simply rely on the formation of an electric double layer to store electrical charge.

As mentioned in the background section, currently available materials are unsuitable for the high volume manufacture of energy storage devices using printable electronic processes. There will now be described an apparatus and associated methods that may or may not overcome this problem.

Graphene-based materials are intriguing from the perspectives of fundamental science and technology because they are non-toxic, chemically and thermally tolerant, and mechanically robust. In the form of nanosheets with lateral sizes in the range of several hundred nanometers, graphene exhibits superior electrical conductivity to graphitic carbon, high mobility of charge carriers (20 $m^2$/V/sec), and fascinating transport phenomena such as the quantum Hall effect, high surface areas of over 2600 $m^2$/g, compatibility with a wide range of chemicals, and a broad electrochemical window that may be particularly advantageous for applications in energy technologies. Graphene nanosheets may be suitable for use as high capacity electrode materials in lithium batteries, lithium-ion batteries, supercapacitors and lithium-ion capacitors as a result of their ability to store a large number of ionic species (lithium ions in particular). In addition, graphene can be transferred to substrates for transparent electronic applications allowing the fabrication of transparent or semi-transparent energy storage devices.

Solution processing of graphene sheets by chemical reduction (as will be discussed shortly) may enable the mass-production of graphene solutions for printing processes. This approach is scalable (allowing the possibility of high-volume production) and versatile (in terms of being well-suited to chemical functionalisation). These advantages mean that the colloidal suspension method for producing graphene could be used for a wide range of applications, in particular, for the fabrication of battery/capacitor electrodes. Graphene-based energy harvesting and storage devices such as batteries and capacitors can potentially out-perform those based on carbon nanotubes. In the form of a colloidal suspension, graphene is also a non-toxic nanomaterial with adjustable solubility suitable for printing applications.

Furthermore, titanium dioxide ($TiO_2$), also known as titanate, facilitates lithium ion transportation and has been used in lithium-ion batteries. Enhanced conductivity of lithium ions has been observed when adding titanium dioxide nanoparticles to solid electrolytes. This effect has been linked to local structural modification of the titanium dioxide which promotes localised amorphous regions, thereby enhancing the transport of lithium ions. Lithium-titanate batteries utilise lithium-titanate nanocrystals (spinel structure) on the surface of its anode instead of carbon. This gives the anode a surface area of about 100 $m^2$/g compared with 3 $m^2$/g for carbon, allowing electrons to enter and leave the anode more quickly. This feature enables lithium-titanate batteries to charge and discharge faster than standard lithium-ion batteries. Lithium titanate spinel is a "zero-strain insertion material". In a battery using this material as an electrode, the insertion of lithium ions does not cause significant deformation of the crystal lattice. It is also intrinsically safe since it avoids electrochemical deposition of lithium. In addition, titanium dioxide is abundant, low cost and environmentally friendly. However, the conductivity of lithium titanate is limited, so it is important to make structures of nanosized crystals in contact with a conductive substrate to achieve a high rate of charge transfer to the electrode.

In the present disclosure, colloidal suspensions have been used to produce new materials composed of chemically modified graphene and titanium dioxide nanoparticles. This approach enables the production of fully-printable, cost-effective lithium-metal batteries (primary batteries), lithium-ion batteries (secondary batteries), and lithium-ion capacitors.

FIG. 5a illustrates schematically an electrical storage apparatus comprising a liquid electrolyte 518 and a new printable electrode formulation 517. To produce a lithium-metal battery or a lithium-ion battery, the electrode formulation 517 is deposited onto a charge-collecting substrate 514 to form the cathode. The anode may comprise lithium metal or a lithium compound (to form a lithium-metal battery) or may comprise graphite (to form a lithium-ion battery). On the other hand, to produce a lithium-ion capacitor, the electrode formulation 517 is deposited onto a charge collecting substrate 514 to form the anode. In this scenario, the cathode may comprise a high surface area material (such as activated carbon) on top of a charge-collecting substrate, or may comprise an intercalation material (such as $LiCoO_2$ or $LiMn_2O_4$).

If a liquid electrolyte 518 is used, the electrical storage apparatus may also comprise a separator 510 to prevent direct physical contact between the cathode 503 and anode 502. In this case, the electrolyte 518 may comprise a lithium salt dissolved in an organic solvent (e.g. a mixture of organic carbonates such as ethylene carbonate or diethyl carbonate containing complexes of lithium ions). Solid or gel electrolytes 519 may be used instead of a liquid electrolyte 518 (as shown in FIG. 5b). In this scenario, the physical state of the electrolyte 519 may itself be sufficient to prevent direct physical contact between the cathode 503 and anode 502, thereby negating the need for a separator 510. The electrolyte 519 may comprise lithium phosphorous oxynitride or derivatives of poly(ethylene oxide). Furthermore, the electrolyte 519 may be a polymer electrolyte containing borate ester groups.

The electrode formulation 517 is prepared as an ink and may be deposited on the charge collector 514 using any standard printing (including inkjet, flexography, gravure, or screen and pad printing) or coating process (including slot coating, bar coating, rod coating, air-knife coating, slide-hopper coating, or curtain coating).

Both printing and coating processes involve the application of a thin film of material onto a substrate. Considering the printing processes first, inkjet printing is a non-impact process wherein electrically charged droplets of fluid ink are projected from a nozzle onto the substrate. The droplets of ink are controlled by digital signals to produce the desired pattern. Flexography, on the other hand, is a relief printing process wherein a flexible plate made of molded rubber is adhered to a printing cylinder, inked with a finely textured roller, and directly rolled onto a substrate to create a printed image. Gravure is a recessed method of printing that uses recessed images etched onto a flat or cylindrical plate which moves through an ink pool. A blade scrapes excess ink off the plate, leaving ink only in the recessed areas, and a second cylinder is used to press the paper against the plate so that it picks up ink from the wells. Screen printing uses a woven mesh to support an ink-blocking stencil. The attached stencil forms open areas of mesh that transfer ink as a sharp-edged image onto a substrate. A roller is then moved across the screen stencil, forcing ink past the threads of the woven mesh in the open areas. Finally, pad printing involves the transfer of an image from a printing plate, via a silicon pad, onto a substrate. A recessed plate is covered with ink. The plate is then wiped clean, leaving ink in the recessed areas. A silicone pad is then pressed against the plate, pulling the ink out of the recesses, and pressing it directly onto the substrate.

Coating processes can be broadly divided into two types; pre-metered and post metered coating. In pre-metered coating, a prescribed amount of liquid is dispensed, generally by control of liquid flow rate, deposited onto the substrate via a coating die or coating hopper. In the simplest case, slot coating, the coating die consists of a narrow slot which has the same width as the substrate being coated, but is sufficiently narrow so as to create a large enough back-pressure that the coating liquid is evenly distributed across the entire width of the slot. In this configuration the exit of the coating die is usually placed a few mm away from the substrate to be coated, which is generally conveyed underneath the die in a roll-2-roll process comprising a wind and unwind roll, plus tensioning and guidance mechanism to ensure uniform deposition. In a slide hopper coater, the coating die has several slots which are located adjacent to each other, with each exit slightly lower than the previous to form a "slide" (hence the name slide-hopper). Liquid emerges from each slot simultaneously, and since the flows are laminar, multiple layers of liquid with different constitution can be coated in a single operation onto the substrate, which in this configuration passes within mm of the hopper lip. In a curtain coater, the slide hopper is raised a distance of several tens of mm above the coating substrate, and wire edge guides are used to prevent the liquid surface tension from pulling the liquid into a "V" shape as it descends onto the substrate. In this configuration the liquid impinges with an increased momentum, which imparts hydrodynamic assist that allows for greater coating speeds and less sensitivity to various coating defects than conventional slide-hopper coating.

In post metered coating, liquid is generally metered after deposition onto the substrate, i.e. an excess of liquid is deposited and this is reduced to the desired thickness by use of either mechanical metering devices such as rods or blades which have a set gap that allows a prescribed amount of liquid through. In other methods the metering is done using an air-knife, formed by passing air at high pressure through a slot to remove the excess liquid without contact of a physical rod or blade. Other post metering systems which rely on the liquid hydrodynamics to define the coating thickness can also be used, such as dip-coating or roll-coating.

The formulation 517 comprises a suspension of graphene platelets modified by large counter anions (in the form of an ionic binder) together with titanium dioxide nanoparticles and a lithium salt. The graphene has a high surface area and is a good electrical conductor, whilst the titanium dioxide particles accommodate high concentrations of lithium ions but itself is not conducting. By binding the two together using the ionic binder (large counter anions, possibly in polymeric form), a material is created which has the lithium storage capability of titanium dioxide and the electrical conductivity of graphene. By adding lithium salt to the material, lithium ions are incorporated into the electrode structure which further enhances the performance of the electrical storage apparatus. These lithium ions may be transferred to and/or from the cathode 503 and/or anode 502 during charging and/or discharging to enable the generation and/or storage of electrical energy.

The electrode formulation was prepared using the following method. It should be noted, however, that the quantities and parameters mentioned may be varied in order to scale-up production. First, 20 mg of as-prepared graphene oxide was distributed in 40 ml of ultra-pure water and mixed in an ultrasonic bath (KQ218, 60 W) for 15 mins to obtain a homogeneous and stable dispersion of graphene oxide. Following this, 60 mg of an ionic polymeric binder (such as poly(sodium 4-styrenesulfonate), polyaniline, or poly[2,5-bis(3-sulfonatopropoxy)-1,4-ethynylphenylene-alt-1,4-ethynylphenylene]sodium salt) was added to the graphene oxide dispersion, and mixed in an ultrasonic bath (KQ218, 60 W) for another 15 mins. The resulting mixture was then reduced with hydrazine monohydrate (1.950 mL, 50%) at 80° C. for 24 h to obtain a homogeneous black dispersion. The black dispersion was then filtered through a polycarbonate membrane (0.22 μm pore size) and repeatedly washed with water to remove any excess binder (polymer). The resulting powder (comprising graphene platelets modified by the ions of the binder) was then redistributed into water by ultrasonication in a water bath (KQ218, 60 W) for 15 mins and centrifugation at 5000 rpm for 20 mins. A dark, homogeneous supernatant solution was obtained after removing the sediment. Finally, after synthesis of the functionalised graphene suspension, titanium dioxide nanoparticles (either rutile or anatase) and one or more lithium salts (e.g. $LiPF_6$, $LiBF_4$ and/or $LiClO_4$) were mixed into the solution by ultrasonication (KQ218, 60 W) for 15 mins. Whilst the titanium dioxide nanoparticles used here were less than 25 nm in size, larger particles could have been used instead. The resulting colloidal suspension can then be used as a printable ink to form the battery/capacitor electrodes.

The ionic binder may be an aqueous or organic liquid or gel, and may be a polymer. Whilst PSS, polyaniline, and PPE have been mentioned above, the binder may comprise other polyelectrolytes with large anion groups, or silicon-containing gels that have suitable large anion alternatives. The large polymer anions ensure the effective solubilisation of graphene and attract positively-charged lithium ions into the graphene electrode matrix.

FIG. 6 illustrates schematically a (roll-to-roll) method of producing the electrical storage apparatus of FIG. 5b. In this process, all components are solution processed, and patterned or printed using existing liquid deposition or patterning technology. First, a charge-collection material 614 is deposited. Following this, the electrode formulation 617 is deposited on top of the charge-collection material 614 using a standard printing process, and heated 620 to evaporate any solvent, facilitate binding of the graphene and the titanium dioxide, and encourage the electrode formulation 617 to bond to the charge collector 614. The combination of charge collector 614 and electrode formulation 617 may be considered to constitute the first electrode. Next, a solid or gel electrolyte 619 is deposited on top of the first electrode, before an electrode material 621 is deposited on top of the solid or gel electrolyte 619 to form the second electrode. As stated previously, the electrode material 621 used to form the second electrode will vary depending on whether the electrical storage apparatus is a lithium-metal battery, a lithium-ion battery, or a lithium-ion capacitor.

The performance of a range of lithium-ion batteries with cathodes made from different graphene-based inks was tested. Graphite anodes were used in each battery, and the discharge current was 1 mA. A comparison of the discharging behaviour can be seen in FIG. 7a. The different inks tested were PSS-modified graphene with 0.1M titanium dioxide nanoparticles 722, polyaniline-modified graphene with 0.1M titanium dioxide nanoparticles 723, polyaniline-modified graphene without titanium dioxide nanoparticles 724, and pure graphene solution 725. The PSS-modified graphene solution 722 showed improved conductivity of lithium ions, whilst the polyaniline-modified graphene solution without titanium dioxide 724 exhibited a similar performance to the pure graphene solution 725. The additional of titanium dioxide nanoparticles was seen to improve the polyaniline-modified graphene battery 723, although its discharging performance was still far inferior to the PSS-modified graphene with titanium dioxide nanoparticles 722.

Figure 7B:
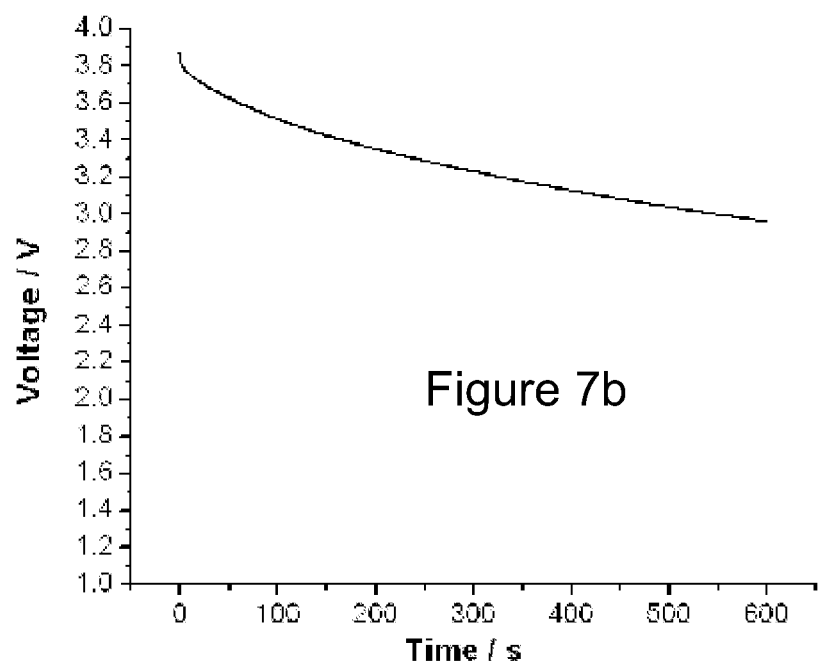
FIG. 7b shows the discharge curve of a lithium-ion battery comprising one of the electrode formulations described herein.
Figure 7C:
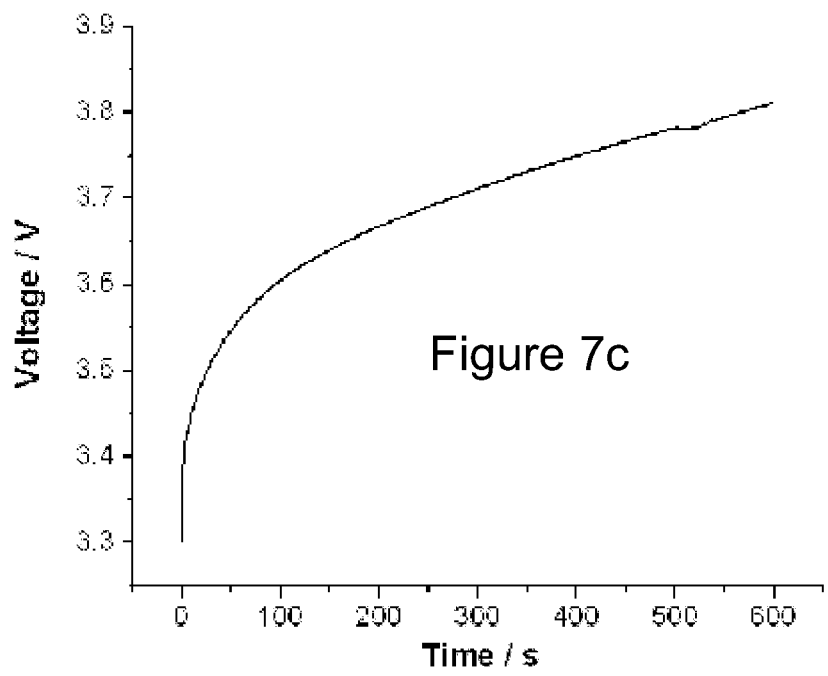
FIG. 7c shows the charging curve of the lithium-ion battery of FIG. 7b.

Whilst the addition of titanium dioxide can increase the lithium ion storage of a lithium-ion battery, too much titanium dioxide can reduce the conductance of the electrodes and limit the solubility of the electrode formulation. When the concentration of titanium dioxide nanoparticles and lithium salt is optimised (0.2M of titanium dioxide and 1M of $LiClO_4$), printed electrodes made from the PSS-modified graphene ink gives a stable battery performance. The discharging and charging curves are shown in FIGS. 7b and 7c, and show that the battery is fully rechargeable. Batteries made from such graphene-based ink were found to have an open circuit voltage of 3.9V, which is higher than that attained in commercially available lithium-ion batteries.

Figure 8:
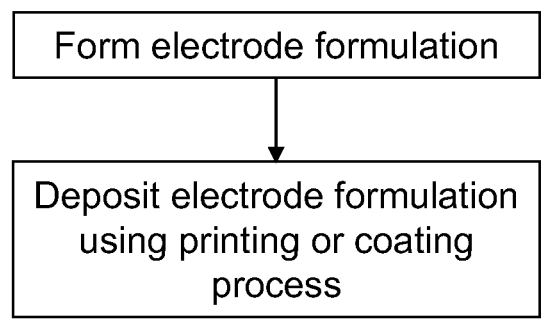
FIG. 8 illustrates schematically a method of producing an electrical storage apparatus comprising a solid or gel electrolyte and an electrode formulation described herein.

The key stages of the method used to make an electrode using the above-described electrode formulation are illustrated schematically in FIG. 8.

Figure 9:
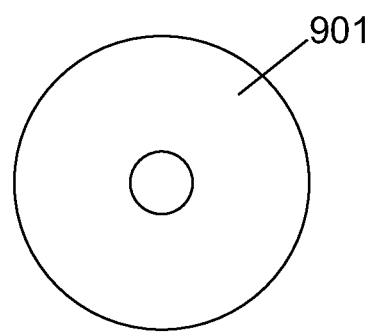
FIG. 9 illustrates schematically a computer readable medium providing a program.

FIG. 9 illustrates schematically a computer/processor readable medium 901 providing a computer program for controlling the making of an electrode and/or the making of an electrical storage apparatus. In this example, the computer/processor readable medium 901 is a disc such as a digital versatile disc (DVD) or a compact disc (CD). In other embodiments, the computer/processor readable medium 901 may be any medium that has been programmed in such a way as to carry out an inventive function. The computer/processor readable medium 901 may be a removable memory device such as a memory stick or memory card (SD, mini SD or micro SD).

The computer program may comprise computer code configured to control one or more of: formation of an electrode formulation, the electrode formulation comprising graphene, titanium dioxide and a binder; and deposition of the electrode formulation using a printing or coating process to form the electrode, the electrode comprising graphene, titanium dioxide and a binder, the binder configured to facilitate the binding together of the graphene and titanium dioxide in the formed electrode.

The computer program may also comprise computer code configured to control one or more of: formation of an electrode formulation, the electrode formulation comprising graphene, titanium dioxide and a binder, the binder configured to facilitate the binding together of the graphene and titanium dioxide in a formed electrode; deposition of the electrode formulation using a printing or coating process to form a first electrode of the electrical storage apparatus; deposition of an electrolyte on top of the first electrode; and deposition of an electrode material on top of the electrolyte to form a second electrode of the electrical storage apparatus, the electrical storage apparatus comprising first and second electrodes and an electrolyte, the electrolyte configured to allow the transfer of mobile ions to and/or from the first and/or second electrodes to enable the generation and/or storage of electrical energy.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state).

The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry may have other functions in addition to the mentioned functions, and that these functions may be performed by the same apparatus/circuitry. One or more disclosed aspects may encompass the electronic distribution of associated computer programs and computer programs (which may be source/transport encoded) recorded on an appropriate carrier (e.g. memory, signal).

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claims is:

1. An electrical storage apparatus comprising:
   an electrode formulation comprising graphene platelets, titanium dioxide, one or more lithium salts, and a poly(sodium 4-styrenesulfonate) binder, the binder configured to facilitate the binding together of the graphene, titanium dioxide, and the one or more lithium salts to form the electrode,
   wherein the electrode formulation is a poly(sodium 4-styrenesulfonate)-modified graphene ink comprising a reduced mixture of graphene oxide comprising suspended graphene oxide platelets modified with the binder,
   wherein the reduced mixture of the graphene oxide further comprises the titanium dioxide as nanoparticles; and
   wherein the electrode formulation is aqueous or non-aqueous;
   wherein the electrical storage apparatus comprises first and second electrodes and an electrolyte without a separator; and
   wherein the electrolyte is configured to allow the transfer of mobile ions to and/or from the first and/or second electrodes to enable the generation and/or storage of electrical energy; and
   wherein the lithium salt comprises one or more of $LiPF_6$, $LiBF_4$, and $LiClO_4$.

2. The electrical storage apparatus of claim 1, wherein the electrolyte is a solid or gel electrolyte.

3. The electrical storage apparatus of claim 2, wherein the solid or gel electrolyte comprises lithium phosphorous oxynitride.

4. The electrical storage apparatus of claim 1, wherein the electrolyte is a polymer electrolyte.

5. The electrical storage apparatus of claim 4, wherein the polymer comprises one or more of the following: derivates of poly(ethylene oxide), and borate ester groups.

6. The electrical storage apparatus of claim 1, wherein the electrical storage apparatus is a lithium-metal battery, a lithium-ion battery, or a lithium-ion capacitor.

7. The electrical storage apparatus of claim 1, wherein at least one of the first and second electrodes is disposed on a self-supporting charge-collecting substrate.

* * * * *